United States Patent
Liao et al.

(10) Patent No.: US 10,146,611 B2
(45) Date of Patent: Dec. 4, 2018

(54) RESILIENT OPTIMIZATION AND CONTROL FOR DISTRIBUTED SYSTEMS

(71) Applicants: Linxia Liao, Mountain View, CA (US); Kun Ji, Plainsboro, NJ (US)

(72) Inventors: Linxia Liao, Mountain View, CA (US); Kun Ji, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 127 days.

(21) Appl. No.: 14/440,906

(22) PCT Filed: Nov. 13, 2013

(86) PCT No.: PCT/US2013/069954
§ 371 (c)(1),
(2) Date: May 6, 2015

(87) PCT Pub. No.: WO2014/078457
PCT Pub. Date: May 22, 2014

(65) Prior Publication Data
US 2015/0301882 A1 Oct. 22, 2015

Related U.S. Application Data (60) Provisional application No. 61/727,858, filed on Nov. 19, 2012.

(51) Int. Cl.
*G06F 11/07* (2006.01)
*G05B 19/418* (2006.01)

(52) U.S. Cl.
CPC ...... *G06F 11/0793* (2013.01); *G05B 19/4184* (2013.01); *G06F 11/0709* (2013.01);
(Continued)

(58) Field of Classification Search
USPC ......................................... 714/47.3
See application file for complete search history.

(56) References Cited

U.S. PATENT DOCUMENTS 6,738,748 B2 * 5/2004 Wetzer ................. G06Q 10/06
705/7.14
7,254,750 B1 * 8/2007 Okun .................. G06F 11/3452
714/47.2
(Continued)

FOREIGN PATENT DOCUMENTS

CN 101069138 A 11/2007
CN 101285463 A 10/2008
(Continued)

OTHER PUBLICATIONS

Chinese Patent Application Office Action dated Oct. 12, 2016 corresponding to Chinese Application No. 201380065567.0; Filing Date: Nov. 13, 2013 (24 pages).
(Continued)

*Primary Examiner* — Kamini B Patel (57) ABSTRACT

A method for controlling a system including a plurality of subsystems, includes receiving operational data from the plurality of subsystems of the system (S21). A future condition of each of the plurality of subsystems is estimated from the received operational data (S22). A control strategy for delaying a need for system maintenance is generated based on the estimated future condition of each of the plurality of subsystems (S23). An operation of the system is controlled based on the generated control strategy (S24).

19 Claims, 7 Drawing Sheets

(52) U.S. Cl.
CPC ........ *G06F 11/079* (2013.01); *G06F 11/0751* (2013.01); *Y02P 80/114* (2015.11); *Y02P 90/14* (2015.11); *Y02P 90/86* (2015.11)

(56) References Cited

U.S. PATENT DOCUMENTS

| | | | | |
|---|---|---|---|---|
| 7,506,215 | B1* | 3/2009 | Maw | G06F 11/0751 709/224 |
| 2002/0174219 | A1* | 11/2002 | Mei | H04L 41/5025 709/224 |
| 2004/0254764 | A1* | 12/2004 | Wetzer | G05B 23/0283 702/184 |
| 2006/0273595 | A1 | 12/2006 | Avagliano | |
| 2008/0082345 | A1* | 4/2008 | Greiner | G06Q 10/06 705/305 |
| 2008/0126171 | A1* | 5/2008 | Baldwin | G06Q 10/06 705/7.14 |
| 2013/0158755 | A1* | 6/2013 | Tang | H01M 10/48 701/22 |
| 2013/0275589 | A1* | 10/2013 | Karthikeyan | H04L 41/142 709/224 |
| 2013/0311673 | A1* | 11/2013 | Karthikeyan | H04L 41/147 709/239 |
| 2015/0350108 | A1* | 12/2015 | Baughman | H04L 47/823 709/226 |

FOREIGN PATENT DOCUMENTS

| | | |
|---|---|---|
| CN | 102541017 A | 7/2012 |
| EP | 2267305 A2 | 12/2010 |
| EP | 2388666 A2 | 11/2011 |

OTHER PUBLICATIONS

PCT International Search Report dated Feb. 17, 2014 corresponding to PCT International Application No. PCT/US2013/069954 filed Nov. 13, 2013 (9 pages).

EP office action dated May 25, 2018, for EP Application No. 13798481.1, 4 pages.

* cited by examiner

RESILIENT OPTIMIZATION AND CONTROL FOR DISTRIBUTED SYSTEMS

CROSS-REFERENCE TO RELATED APPLICATION

The present application is based on provisional application Ser. No. 61/727,858, filed Nov. 19, 2012, the entire contents of which are herein incorporated by reference.

TECHNICAL FIELD

The present disclosure relates to distributed systems and, more specifically, to resilient optimization and control for distributed systems.

DISCUSSION OF THE RELATED ART

A distributed system, in the context of this disclosure, is an electronic and/or mechanical system, which is composed of multiple subsystems and/or subcomponents that operate in concert to perform one or more tasks. The subsystems/subcomponents are not necessarily in direct proximity with each other but they may communicate with each other across a network such as a computer network.

A distributed system may operate pursuant to a control strategy, which may be substantiated either as a controller unit or as a set of rules followed independently at each subsystem/subcomponent. The interaction and behavior of the subsystems may be controlled and optimized to achieve a common system function goal in an effective and efficient way. In general, control strategies may direct the subsystems/subcomponents of the system to provide a desired level of output, with the consideration of physical constraints, run-time scheduling, economics, etc. For example, where the system is responsible for power generation on a ship, the control strategy may operate to ensure that enough subsystems/subcomponents are operational to meet the power utilization requirements of the ship at any given time. According to another example, where the system functions to provide printing services to a cluster of workstations, the control strategy may operate to assign print jobs to various printers in accordance to the requirements of each print job, the capabilities of each printer and printer availability.

SUMMARY

A method for controlling a system including a plurality of subsystems, includes receiving operational data from the plurality of subsystems of the system. A future condition of each of the plurality of subsystems is estimated from the received operational data. A control strategy for delaying a need for system maintenance is generated based on the estimated future condition of each of the plurality of subsystems. An operation of the system is controlled based on the generated control strategy.

The operational data may include instructions sent to the subsystems, measurements of subsystem operation, or data output from the subsystems during operation.

The future condition of each of the plurality of subsystems may be estimated using prognostic analysis. The future condition of each of the plurality of subsystems may be estimated by a plurality of distributed prognostic engines that are disposed locally with respect to the plurality of subsystems. The future condition of each of the plurality of subsystems may be a measure of operational quality of the corresponding subsystem. The future condition of each of the plurality of subsystems may be a measure of predicted time to failure of the corresponding subsystem. The future condition of each of the plurality of subsystems may be a measure of predicted operational efficiency of the corresponding subsystem.

The generated control strategy may define a level of utilization for each subsystem of the plurality of subsystems. The generated control strategy may dictate that subsystems with a future condition that is estimated to be relatively poor are defined to have a relatively low level of utilization while subsystems with a future condition that is estimated to be relatively strong are defined to have a relatively high level of utilization.

The generated control strategy may maximize a time until the system maintenance is required. The generated control strategy may delay the need for the system maintenance until the system maintenance becomes available. The generated control strategy may minimize a risk of system failure by reducing utilization to one or more compromised subsystems. A compromised subsystem may be a subsystem that has been estimated to have a poor future condition. Utilization of the compromised subsystems may be reduced by diverting operational responsibility to other subsystems of the plurality of subsystems that are not compromised.

A controlled system includes a plurality of subsystems. An optimization and control engine is configured to receive operational data from the plurality of subsystems, generate a control strategy for delaying a need for system maintenance based on an estimated future condition of each of the plurality of subsystems, and control the operation of the system based on the generated control strategy. A prognostic engine receives the operational data from the subsystems and estimates the future condition of each of the plurality of subsystems.

The operational data may include instructions sent to the subsystems, measurements of subsystem operation, or data output from the subsystems during operation.

The prognostic engine may estimate the future condition of each of the plurality of subsystems using prognostic analysis. The prognostic engine may include a plurality of distributed processing units that are disposed locally with respect to the plurality of subsystems.

The future condition of each of the plurality of subsystems may be a measure of operational quality of the corresponding subsystem, a measure of predicted time to failure of the corresponding subsystem, or a measure of predicted operational efficiency of the corresponding subsystem.

The generated control strategy may define a level of utilization for each subsystem of the plurality of subsystems, dictate that subsystems with a future condition that is estimated to be relatively poor are defined to have a relatively low level of utilization while subsystems with a future condition that is estimated to be relatively strong are defined to have a relatively high level of utilization, maximize a time until the system maintenance is required, delay the need for the system maintenance until the system maintenance becomes available, or minimize a risk of system failure by reducing utilization to one or more compromised subsystems. A compromised subsystem may be a subsystem that has been estimated to have a poor future condition.

A method for controlling a system including a plurality of subsystems, includes receiving operational data from the plurality of subsystems of the system. It is determined whether each of the plurality of subsystems is in a compromised state based on the received operational data. A control strategy for delaying a need for system maintenance is generated by reducing utilization of those subsystems determined to be in the compromised state. An operation of the system is controlled based on the generated control strategy.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an approach for control of a distributed system that optimizes for resiliency. As used herein, resiliency refers to an extent of adequate operation (e.g. system normalcy), which may be measured either in terms of time or extent of utilization. For example, resiliency may be maximized by extending a length of time adequate electrical power may be maintained by a power generation system. For example, resiliency may be maximized by extending a number of print jobs that may be adequately satisfied by a system of printers. By exercising a control strategy to extend resiliency, exemplary embodiments of the present invention may increase operational availability of a distributed system and in so doing, may reduce the cost associated with maintenance of the system, and in certain cases where availability of maintenance is limited, operational availability may be extended to provide uninterrupted availability until a time in which maintenance may become available.

Exemplary embodiments of the present invention seek to provide an approach for control of a distributed system that mitigates degradation of system components, without relying on maintenance, so that proper operation may be maintained/extended even in the absence of maintenance.

As existing control strategies for distributed system may focus exclusively on providing a desired level of service, existing control strategies do not consider subsystem performance degradation, always assume that all operational subsystems/subcomponents will continue to function properly (i.e. provide 100% performance as requested) until which time that they no longer function properly.

On the other hand, approaches for scheduling system maintenance may be used to monitor the operating condition of system components, but this monitoring may then be used exclusively for determining when maintenance is needed.

Exemplary embodiments of the present invention may monitor the operating condition of subsystems/subcomponents within a distributed system to assess a heath factor of each component, the health factor being a measure of the remaining extent of usefulness of the subsystem/subcomponent. A novel Resilient Operation and Control Strategy (ROCS) may then influence the utilization of the distributed system in an effort to maximize the overall resiliency of the system without the need for maintenance. Thus unlike approaches for monitoring system health which focus on determining when to perform maintenance, exemplary embodiments of the present invention monitor system health for the purpose of controlling system operation and forestalling maintenance. By forestalling maintenance, maintenance costs may be reduced and in some cases, such as for the ship-based power generation, in which a ship out at sea may not be able to receive maintenance until the end of the voyage, adequate operation may be prolonged until maintenance becomes available.

The ROCS approach may utilize continuously updated prognostics information of distributed subsystems to maintain a system's availability, proactively prevent subsystem failure and to extend system reliability during real-time optimization and scheduling. The prognostics based resilient optimization control strategy not only detects system disturbance and subsystem degradation event, but also assesses future performance condition of the subsystems which may then be used to mitigate the risk by modifying the optimization and control strategy and maintain acceptable level of system operation or service in undesirable situations.

The ROCS approach, in accordance with exemplary embodiments of the present invention, may include a new optimizer that utilizes constantly updated prognostics information as additional weighting factors in resources planning and real-time scheduling to prolong the system availability. This optimizer may be referred to herein as performing Prognostics Enabled Optimization.

The ROCS approach, in accordance with exemplary embodiments of the present invention, may implement prognostic algorithms designed to take advantage of distributed architecture to forecast subsystems' behavior and assess future risks in terms of failure probability of subsystem. These algorithms may be referred to herein as Distributed Prognostics.

Exemplary embodiments of the present invention may take into consideration the degradation and availability of each subsystem. By so doing, the operating mission of the entire system may be saved as its length of use is extended. As a subsystem performance starts to degrade, less performance requirement may be scheduled to this subsystem to maintain or prolong its availability. Alternatively, or additionally, tasks that are determined to be less taxing may be routed to the at-risk subsystem while more taxing tasks are dispatched to more healthy subsystems.

For example, an optimization and control strategy of a shipboard power system may optimize the required power from several generators (subsystem) to accelerate a ship with minimum fuel consumption. The power requested from each generator may be optimized based on the physical constraints and fuel consumption rates of the various generators. Exemplary embodiments of the present invention may additionally consider the health information of each generator during the optimization decision. For example, rather than assuming that all generators are always capable of providing their maximum specified power at a specified rate of fuel consumption, if the performance of a generator is degraded, exemplary embodiments of the present invention may divert load from the compromised generator to other generators, even where the other generators may ordinarily be less efficient (but still more efficient than the compromised generator), and even where the compromised generator is still able to function. Here the performance of the generator may include such features as its operational fuel efficiency, its risk of failure, or some other measure of operating condition. Accordingly, where a conventional approach may select the compromised generator for use over other generators, exemplary embodiments of the present invention may be able to take the reduced function of the compromised generator into consideration and optimize accordingly.

The compromised generator may, for example, function perfectly well at the time, however, where exemplary embodiments of the present invention determine that future failure is likely, the load carried by that generator may be reduced right away.

As the measure of health considered in making this determination may look ahead to potential future problems, rather than only correcting for components that have failed, this health information is described herein as prognostics information. While prognostic information may otherwise be used to perform off-line maintenance activities, exemplary embodiments of the present invention use this prognostic information for real-time optimization and control.

The proposed optimization and control strategy integrates prognostics information of each subsystem into the real-time planning and scheduling of the system resources. This approach may increase the whole system's reliability and prolong subsystem's availability by proactively preventing sudden subsystem failure.

With the consideration of prognostics information during real-time control, the control system's resiliency against subsystem performance degradation may be increased. New resilient optimization strategies in accordance with exemplary embodiments of the present invention may define quantification of system resiliency in terms of system performance and subsystem degradation period.

The architecture for performing the prognostic algorithms themselves may be distributed in nature. In so processing the prognostic algorithms, the distributed system under control may be used. Thus by implementing the prognostic algorithms within the distributed system instead of utilizing a centralized architecture, exemplary embodiments of the present invention may be more flexible for on-board deployment.

Figure 1:
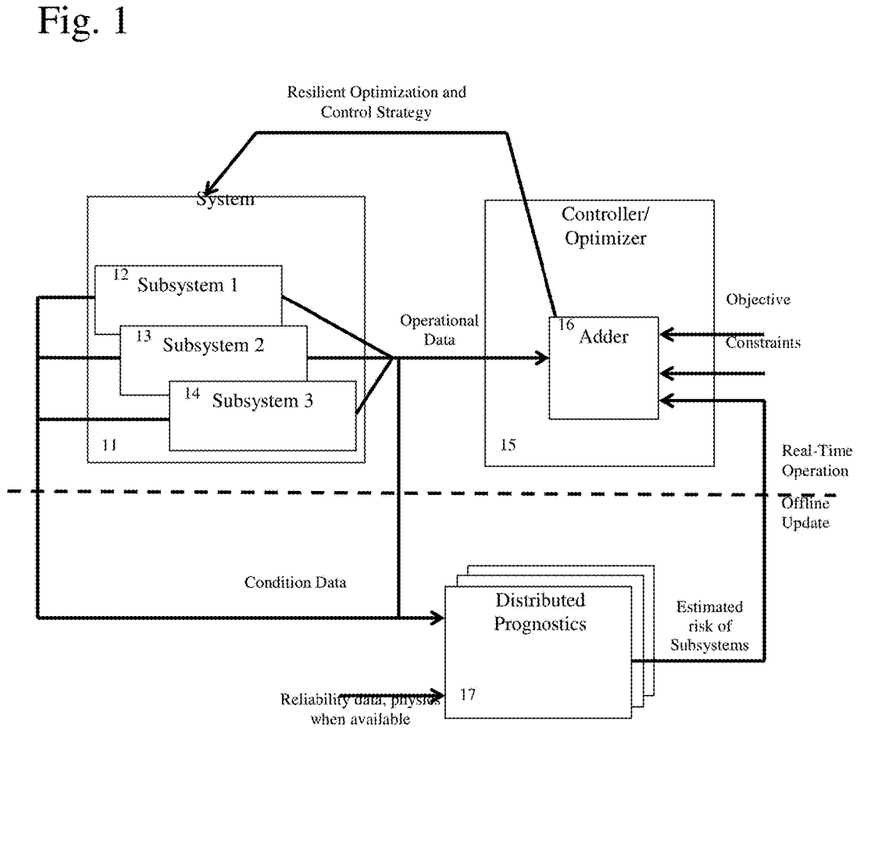
FIG. 1 is a schematic diagram illustrating a simplified system for performing resilient optimization and control in accordance with exemplary embodiments of the present invention.

FIG. 1 is a schematic diagram illustrating a simplified system for performing resilient optimization and control in accordance with exemplary embodiments of the present invention. The Resilient Optimization and Control Strategy (ROCS) may be used to govern the control of a system via optimizing the behavior of multiple subsystems to maximize a time to maintenance or to extend a time to maintenance past a predetermined threshold as shown.

A control loop is formed between each a system 11 and a controller/optimizer 15. According to this control loop, operational data from each subsystem 12, 13, and 14 are sent to an adder unit 16 of the controller/optimizer 15. The adder 16 combines the operational data and the controller/optimizer 15 analyzes the combined data in light of received objectives and constraints. The controller/optimizer 15 thereafter provides a control strategy to the system 11 based on the analysis.

Exemplary embodiments of the present invention expand this control loop by using a set of computer systems to perform distributed prognostics 17. These distributed prognostics systems 17 receive the commands to the subsystems 12, 13, and 14, as well as the output of the subsystems 12, 13, and 14 as condition data. Where available, the distributed prognostics systems 17 further receive reliability data and physics data. The distributed prognostics systems 17 use this reliability data and/or physics data to interpret the condition data to determine the effect on resiliency that various operational controls may have. For example, the distributed prognostics systems 17 may use the condition data to provide estimated risk of subsystem compromise and information pertaining to factors that mitigate the risk of compromise. This data is provided back to the controller/optimizer 15, which uses this data along with the objectives and constraints to create a control strategy for optimizing resiliency, which is provided to the system 11 for the control thereof.

While the sending of the operational data from the various subsystems 12, 13, and 14 to the controller/optimizer 15 and the sending of the control strategy from the controller/optimizer 15 back to the system 11 may be performed in real-time, the analysis of the condition data and the estimation of subsystem risk performed by the distributed prognostics 17 may be performed offline.

Figure 2:
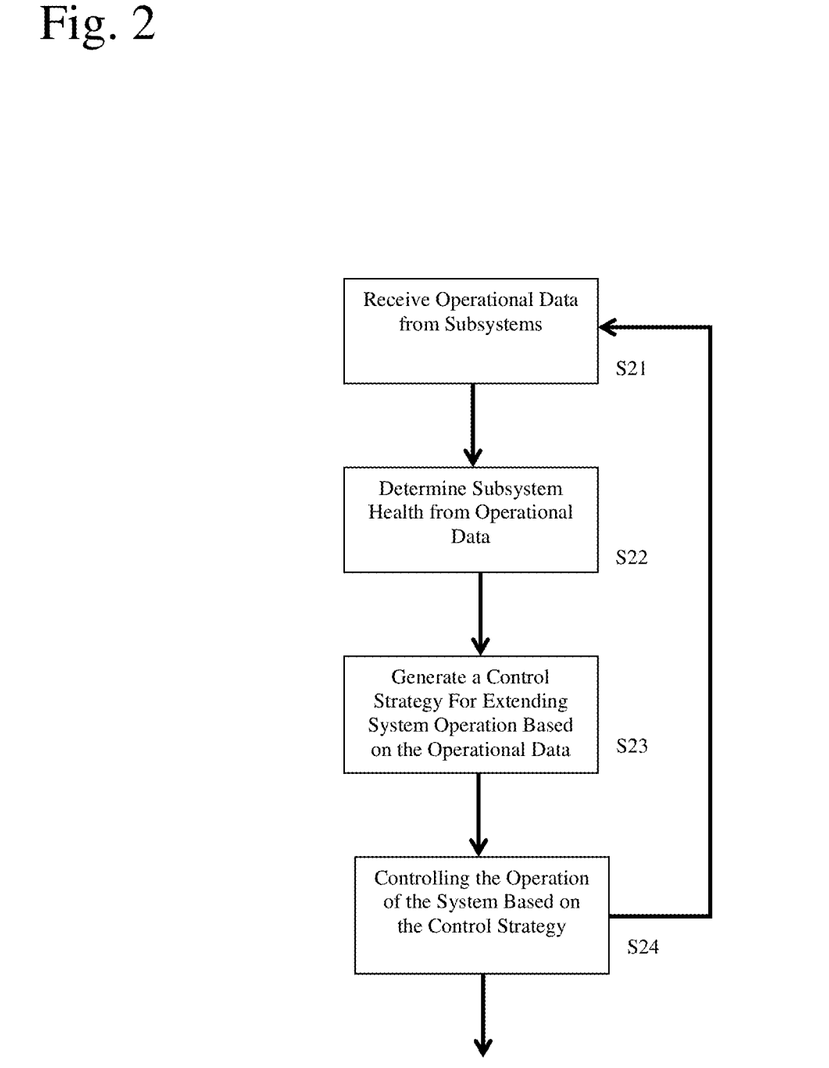
FIG. 2 is a flowchart illustrating an approach for the control of a distributed subsystem in accordance with exemplary embodiments of the present invention.

FIG. 2 is a flowchart illustrating an approach for the control of a distributed subsystem in accordance with exemplary embodiments of the present invention. First, operational data may be received by the prognostic engine (PE) from the subsystems (Step S21). As discussed above, the PE may be a distributed entity comprising a plurality of PE units. As the system itself may be comprised of a plurality of subsystems, the distributed PE units may be built upon or around the subsystems themselves, for example, to permit subsystem processing capacity to provide the PE units. The operational data may include the commands sent to, as well as the output sent from, the various subsystems.

Next, a measure of health may be determined based on the received operational data (Step S22). In determining the measure of health, reliability data and system physics data may also be considered. Each subsystem may receive its own measure of health. The measure of health may be a single value, for example, a normalized value between 0 and 1, indicating a likelihood of failure, or the measure of health may provide various levels of operational capacity pertaining to multiple capabilities or vulnerabilities of each subsystem. For example, if the system is a set of power generators and each subsystem is a generator, a single measure of health may be determined for each generator, the measure of health indicating how close the generator is to failure as a result of continued use. For example, where the system is a cluster of printers and each subsystem is a color printer, there may be multiple indicators for each system including a level of remaining black toner, a level of remaining magenta toner, a level of remaining yellow toner, and a level of remaining cyan toner.

From the one or more determined measure of health, an optimization and control engine (OCE) may generate a control strategy for extending system operation (Step S23). In addition to the use of the health measures, which may function as estimates of risk to each subsystem from one or more use factors, various objectives and/or constraints may be used. The generation of the control strategy may include optimizing for operational longevity of the entire system by allocating the tasks assigned to the various subsystems in such a way as to reduce the failure risks to the various subsystems based on the health information. The OCE may also receive the operational data directly from the subsystems and this operational data may be used as feedback for aiding control.

Thereafter, the operation of the system and its constituent subsystems may be controlled based on the generated control strategy (Step S24). This may include assigning tasks to the various subsystems to reduce the strain placed on subsystems that are seen as more likely to fail or to otherwise redirect those tasks that are most likely to induce failure in the compromised subsystems to other subsystems. By so doing, a period of time between maintenance procedures may be extended, and in some cases, the time until maintenance may be extended long enough to see the availability of maintenance that was previously unavailable.

Moreover, the control strategy need not only act to forestall failures, the control strategy may serve to extend a period of time that they system may remain operational without suffering other ill consequences such as increased maintenance costs when maintenance does occur. Exemplary embodiments of the present invention optimize the control strategy not only to put off maintenance but to extend fully normal healthy operation of the system.

The steps of receiving operational data (Step S21), determining subsystem health therefrom (Step S22), generating the control strategy for optimizing system resiliency (Step S23), and controlling the operation of the system based on the control strategy (Step S24) may be repeated for as long as the system is running. Maintenance may later be provided when needed and/or available.

Accordingly, the ROCS method of exemplary embodiments of the present invention proactively mitigates system risks by taking into consideration the subsystems' health condition using prognostics methods. The operational data (e.g. speed, loading) and condition data (e.g. voltage, current, temperature) may be used to model health indicators of the subsystems. Examples of health indicators may include certain observation signals, deviations from nominal operating states, or residuals of a physics model. A prognostics algorithm (e.g. particle filter) may be used to interpolate the future progression of the health indicator until it reaches a predefined failure/unacceptable threshold. The output of the prognostics algorithm may be a risk measure of the subsystem in terms of failure probability or remaining useful life (RUL). If prognostics information is not available because e.g. it requires special sensors, reliability data (e.g. event logs) may also be used to build hazard assessment model to facilitate future risk estimation. The risk measure may be used as a weighting factor of each subsystem in the optimizer which optimizes the objective (e.g. minimize fuel consumption of the power system for a certain shipboard mission such as acceleration) considering the constraints (e.g. capacity of each generator). The output of the optimizer (e.g. control set points) is fed back to the local control of the subsystem. The prognostics analysis may be built offline and updated as shown in FIG. 1, for example, when new measurement is received or when a predefined update cycle is reached.

In addition to providing a means for offering resilient optimization and control, exemplary embodiments of the present invention quantify system resiliency of each subsystem and/or the system as a hole. This quantification may then be used by the ROCS approach in the optimization of resiliency. A System Resiliency Index (SRI) may be used to indicate how resilient a system is. This index may be defined in terms of the following indicators as:

$$SRI = \frac{\Delta T_f + \Delta T_p}{\Delta T_r * \Delta P_{max}}.$$

Here, $\Delta T_f$ may indicate how long the system can maintains operational normalcy after a subsystem degradation occurs, $\Delta T_p$ may indicate how fast the system performance drops to the bottom, $\Delta T_r$ may indicate how fast the system recovers from the subsystem failure, $\Delta P_{max}$ may represent the maximum system performance degradation after a subsystem failure.

Figure 3:
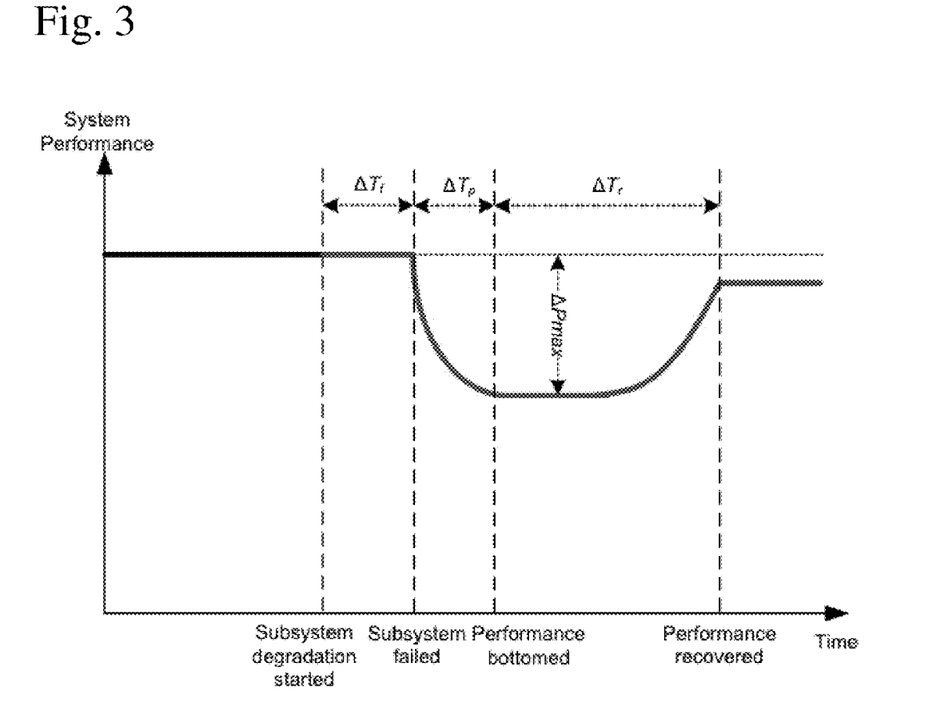
FIG. 3 is a graph illustrating the variables contributing to SRI in accordance with exemplary embodiments of the present invention.

FIG. 3 is a graph illustrating the variables contributing to SRI in accordance with exemplary embodiments of the present invention. Here it may be seen that a system is more resilient than others if it can hold system performance longer during subsystem degradation and failure or recover faster from the performance degradation or deliver less performance degradation after a subsystem failed.

Figure 4:
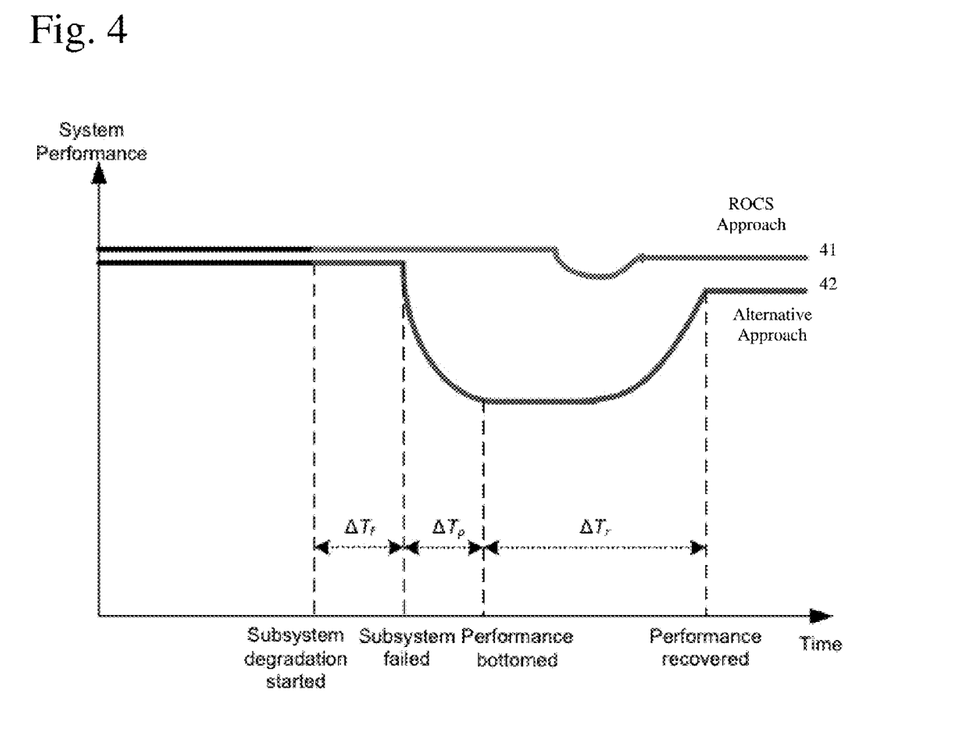
FIG. 4 is a graph illustrating system resiliency indicators of a system with ROCS in accordance with exemplary embodiments of the present invention.

FIG. 4 is a graph illustrating system resiliency indicators of a system with ROCS in accordance with exemplary embodiments of the present invention. Here an expected result of the ROCS approach discussed above may be seen as curve 41 and an expected result of a control strategy without the use of distributed prognosis may be seen as curve 42. As shown, ROCS may increase system's resiliency and maintain and prolong system operational normalcy period during subsystem degradation and failure.

For the example of shipboard power system described above, the system performance may be measured by factors such as better fuel consumption, better acceleration capacity, etc.

With the consideration of the distributed subsystem degradation and prognostic information, exemplary embodiments of the present invention may be used to prevent sudden subsystem failure and prolong system operational normalcy period during significant subsystem degradation. The optimization and control strategy may be continuously modified based on the prognostics information to accommodate the subsystem performance degradation. The optimization and control strategy may take action including, for example, to reduce stress placed on the degraded subsystem to prevent failure. Such actions may include, for example, calling for less power to be generated from the degraded power generator in the optimization and control of the shipboard power system.

However, exemplary embodiments of the present invention may take more deliberate action than reducing load to the compromised subsystems. The manner in which the subsystem is used may be modified to postpone failure. For example, where the system is a cluster of color printers and one particular printer is running low on black toner, print jobs that use relatively little black toner may be directed to the compromised printer while print jobs that use more black toner may be directed to other printers within the cluster. By so doing, the time required before the compromised printer is completely out of black toner, and is therefore unable to process any further print jobs, may be delayed. By implementing an ROCS with this ability, the number of times that service need be performed on the printer cluster may be reduced, and, for example, in the event that there is a temporary disruption in the supply of a particular toner, full functionality of the printer cluster may be maintained for a longer length of time.

Figure 5:
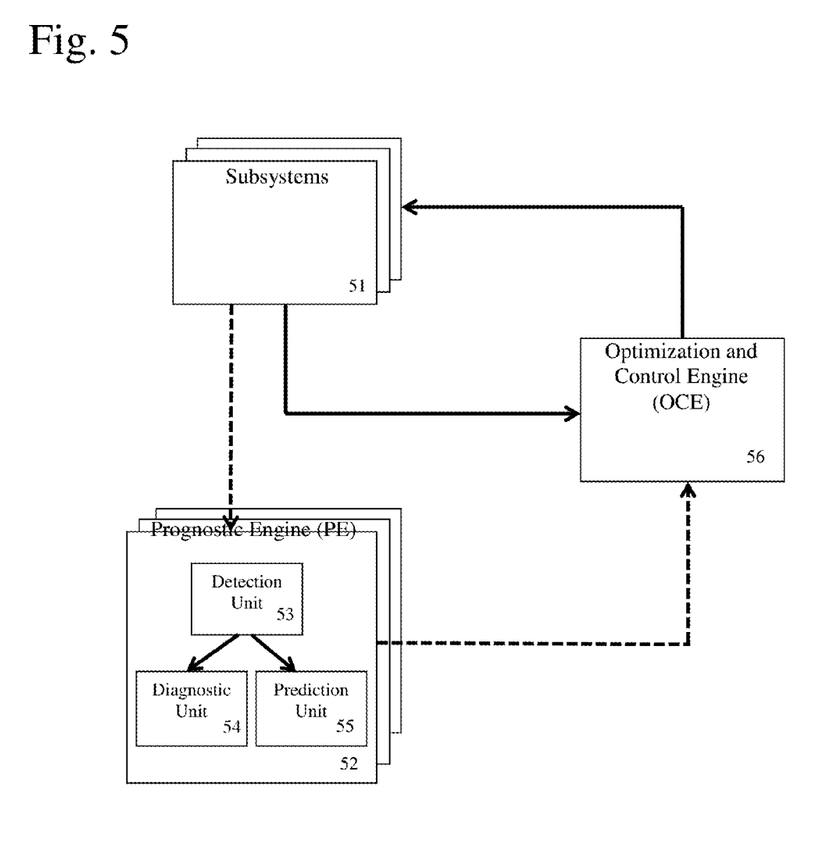
FIG. 5 is a schematic diagram illustrating an approach for performing an ROCS that includes the use of an optimization and control engine (OCE) and a distributed prognostics engine working together in two layers in accordance with exemplary embodiments of the present invention.

FIG. 5 is a schematic diagram illustrating an approach for performing an ROCS that includes the use of an optimization and control engine (OCE) and a distributed prognostics engine working together in two layers. The first layer comprises the solid-line arrows connecting the subsystem 51 with the OCE 56. Each of the subsystems 51 provides their operational data to the OCE 56 and then the OCE 56 provides a control strategy to the subsystems 51. The second layer comprises the dotted-arrow lines connecting the subsystems 51 to a prognostic engine (PE) 52 and connecting the PE 52 to the OCE 56. Each of the subsystems 51 send their condition data to the PE 52 and the PE 52 sends estimated risk of the subsystems to the OCE 56.

As discussed above, traditional approaches for optimization and control do not take into consideration the degradation and availability of the subsystems. Accordingly, under such approaches, there may be a substantial risk of system failure upon the breakdown of a key subsystem. However, according to exemplary embodiments of the present invention, when a subsystem's performance starts to degrade, less performance requirement are scheduled to the affected subsystem to maintain or prolong its availability and thereby preserving the normal operation of the entire system. Exemplary embodiments of the present invention may substantiate the OCE in either a centralized or distributed form. In either form, the OCE may optimize the utilization of the resources (e.g. requiring certain performance from each subsystem to minimize a system level cost function).

In a complex system with n subsystems, an optimization and control problem may be to complete a system goal with minimized cost function which could be defined as, for example, the resource consumption subject to some constraints. An example of optimization task is described as follows:

$$\begin{cases} \text{Cost function} = \min \sum_{i=1}^{n} f_i(r_i) \\ \text{Constraints} \\ \text{Total request: } \sum_{i=1}^{n} r_i = R \\ \text{Boundary condition } r_{ilb} \le r_i \le r_{iab} \end{cases}$$

Here $f_i(r_i)$ is the cost function for subsystem I and $r_i$ is the required performance from subsystem i. For the example of shipboard power system, if the optimization task is to minimize fuel consumption in the shipboard power system as described above, $f_i(r_i)$ may represent the fuel consumption of generator i providing power $r_i$. Accordingly, $f_i(r_i)$ would be the objective to minimize. R is the total power demanded or required to complete a mission. As the total power required will be provided by the multiple generators in the system, the constraints are that the sum of all power provided by all generators must be equal to R and each generator can only provide power within its capacity range.

Here, $r_{ilb}$ and $r_{iub}$ are the lower bound and upper bound of the power that can be provided by generator i.

The above optimization problem does not consider the health condition of the subsystems and may always assume the subsystem can provide 100% performance whenever it is required. However, if the health condition of one of the subsystem is degraded and this is not considered in the optimization, the optimization and control engine keeps pushing requirements (e.g. power requests) to the subsystem (e.g. the generator), then the system may not be able to acquire required performance from the degraded subsystem, which may compromise the entire system's mission. Furthermore, the degraded subsystem is kept working under the assumption that it is in its full performance and this may lead sudden or early failure. To consider the degradation of the subsystem, the prognostics information such as failure probability or prediction of remaining useful life ($RUL_i$) can be used to model a risk measure of subsystem i. The risk measure of subsystem i($W_i$) can be modeled as:

$$W_i = \begin{cases} \exp\left(-\frac{RUL_i}{Norm}\right), (RUL \text{ predicted}) \\ 0 (\text{no fault, no degradation}) \\ 1 (\text{failed}) \end{cases}$$

Here, Norm is an expected normal RUL that can ensure the system availability for the entire mission.

Approaches for performing ROCS in accordance with exemplary embodiments of the present invention may take the risk measure of each subsystem into consideration and the minimizing of risk may be introduced into the original cost function. The new optimization and control strategy may therefore be described as:

$$\begin{cases} \text{New risk weighted cost function} = \min \sum_{i=1}^{n} W_i f_i(r_i) \\ \text{New constraints} \\ \sum_{i=1}^{n} r_i = R \\ \text{if } W_i = 1, \text{ then } r_i = 0, \text{ otherwise,} \\ \quad r_{ilb} \le r_i \le r_{iab} \end{cases}$$

This cost function may minimize the risk of pushing harder requirements on degraded subsystems, thus reducing the probability of sudden or early failure of the subsystem and by so doing, the entire system may become more reliable and resilient as described above and illustrated in FIG. 4.

Figure 6:
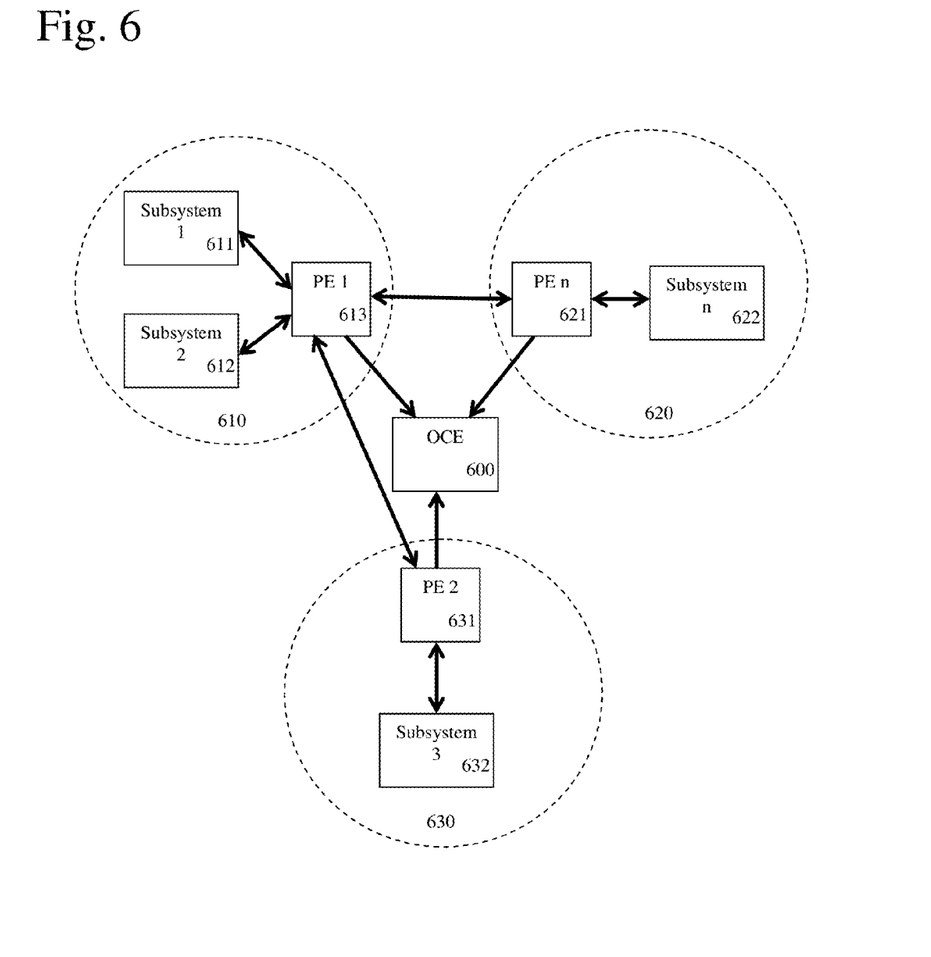
FIG. 6 is a schematic diagram illustrating a distributed Prognostics Engine (PE) used to perform health condition monitoring and risk assessment locally for each subsystem in accordance with exemplary embodiments of the present invention.

Prognostics may deal with large amount of data. This data may overwhelm data traffic and processing power of a centralized computer. Moreover, a centralized computer may be vulnerable to loss of whole functionality in case of crash or power loss. Increasing complexity of the prognostics algorithm may also impair the computing performance of the PE. For complex systems, exemplary embodiments of the present invention may utilize a distributed architecture for prognostics algorithms leveraging distributed resource (e.g., the distributed resources of the system being monitored and controlled) for online calculation. FIG. 6 is a schematic diagram illustrating a distributed Prognostics Engine (PE) (e.g. a computing unit that can monitor signal, process data, and communicate with the main OCE) that may be used to perform health condition monitoring and risk assessment locally for each subsystem in accordance with exemplary embodiments of the present invention. Each PE may have sufficient computing power and the complexity of prognostics algorithm may be increasing with higher accuracy requirement of more historical data. Accordingly, each of the PEs may communicate with each other, to collaboratively estimate the risk of a subsystem and optimize the system resources harnessing the distributed computing power and minimizing the commutating penalty in the mean time. Accordingly, a distributed architecture may be established for the subsystems and the PEs. An alternative design includes a strategy to efficiently distribute the most computational steps of the prognostics algorithms to multiple processors that are not otherwise related to the system under monitoring and control.

As can be seen in FIG. 6, there may be multiple subsystems (e.g. subsystems 1, Subsystem 2, . . . Subsystem n). Here only four subsystems: "Subsystem 1" 611, "Subsystem 2" 612, "Subsystem 3" 632, and "Subsystem n" 621 are shown for convenience but it is to be understood that there may be any number of additional subsystems. The prognostic engine (PE) may be instantiated as multiple distributed PE processing units "PE 1" 613, "PE 2" 631 and "PE n" 621 although it is to be understood that there may be any number of additional PEs. The PE units may be distributed throughout the system and each PE unit may have a corresponding processing area defining the subsystems that it is responsible for. For example, PE 1 (613) may have a processing area 610 that includes Subsystem 1 (611) and Subsystem 2 (612), PE 2 (631) may have a processing area 630 that includes Subsystem 3 (632), and PE n (621) may have a processing area 620 that includes Subsystem n (622). Just as there may be any number of PE units, each PE unit may have a processing area including any number of subsystems.

An optimization and control engine (OCE) 600 may be in communication with each of the PEs 613, 631, and 621. The PEs may also be in communication with each other, either directly or via the OCE 600, and may thereby comprise a distributed PE.

Where prognostics information cannot be found (e.g. a certain special sensor and/or its analysis are not available), reliability information (e.g. event logs) can be utilized to build hazard assessment model to facilitate future risk measurement in terms of RUL or failure probability prediction. Where sensor data is available, it may be used to model the system and/or subsystem's health indicator. The health indicator can be, for example, a certain observation signal, a deviation from nominal operating states, a combined indicator from multiple signals, and/or a residual of a physics model. As in a complex system, the health of a system is often related to multiple observation signals and an accurate physics model may be hard to obtain and sometime intractable for complex systems, prognostics modeling in accordance with exemplary embodiments of the present invention may focus on a data-driven approach combining multiple signals to construct system health indicator $h_x$. For example, an evolving self-organizing map (SOM) algorithm may be used for the subsystem health indicator construction owing to the limited computational resource on a real-time control system. The evolving SOM algorithm may be used to train a SOM incrementally when each measurement data is available.

Where $h_x$ exceeds a predefined limit, the measurement may be considered as an anomaly. If there is a directly observable trending of $h_x$, then $h_x$ may be directly used for prediction. In the situation when there is no directly observable trending of $h_x$ but intermittent abnormal events appear indicated by high $h_x$ values, the frequency of these events may be calculated as a function of the health indicator $f(h_x)$=a number of abnormal events observed over a predetermined period of time.

Where an increasing trend of $h_x$ is detected, a prediction function may be triggered to estimate how much time is left before $h_x$ reaches a failure threshold. The prediction of $h_x$ may be performed by a continuous Bayesian update assuming the progression of $h_x$ following certain physics fault progression model e.g. Paris Law. After solving the parameter estimation of the $h_x$ distribution, the parameters may be projected over time to estimate the future projection of $h_x$. The time from the starting of prediction to the time when the predicted performance deviation reaches a predefined failure threshold is output as an indicator to remaining useful life (RUL). The uncertainty of the prediction may also be modeled as a pdf function of $h_x$. In the case where no trending is detected, $f(h_x)$ may be used instead of $h_x$.

Figure 7:
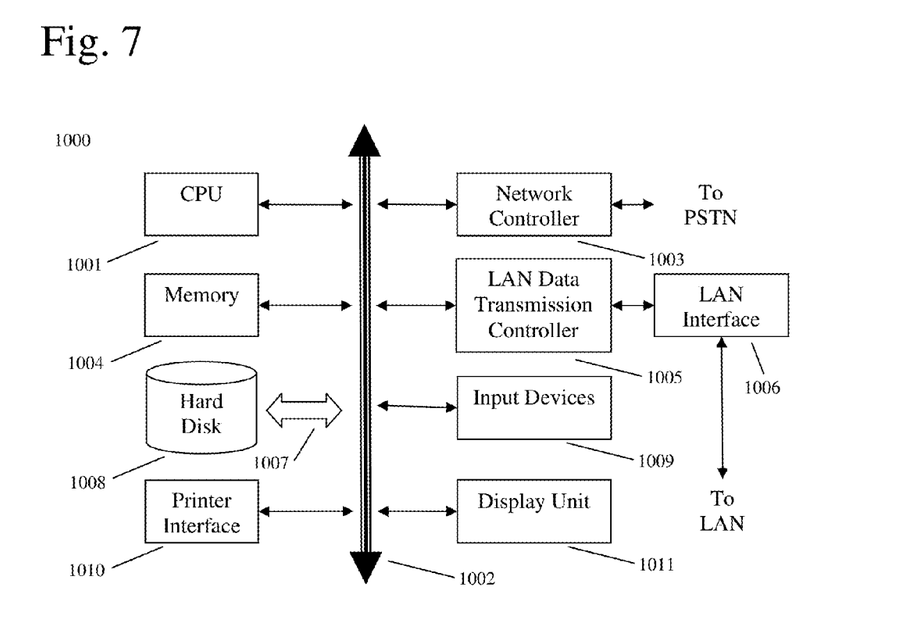
FIG. 7 shows an example of a computer system capable of implementing the method and apparatus according to embodiments of the present disclosure.

FIG. 7 shows an example of a computer system which may implement a method and system of the present disclosure. One or more computer system, such as is shown, may be used in subsystems, the optimization and control engine (OCE), and/or the distributed or single prognostic engine (PE) unit(s).

The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for controlling a system including a plurality of subsystems, comprising:
    receiving operational data from the plurality of subsystems of the system;
    estimating a future condition of each of the plurality of subsystems from the received operational data, wherein the future condition of each of the plurality of subsystems is collaboratively estimated using prognostic analysis by a plurality of distributed prognostic engines that are disposed locally with respect to the plurality of subsystems, wherein the prognostic analysis comprises:
        constructing a health indicator for each subsystem based on combining multiple measurements of the operational data using an evolving self-organizing map algorithm, and calculating a prediction of remaining useful life
wherein:
on a condition the health indicator has no observable trend, the prediction is based on a function of instances when the health indicator exceeds a threshold over a predetermined period of time; and
on a condition that the health indicator has an increasing trend, the prediction is based on a continuous Bayesian update of a fault progression for parameters to a predicted performance deviation reaching a threshold;
generating a control strategy for delaying a need for system maintenance based on the estimated future condition of each of the plurality of subsystems, wherein the control strategy maximizes a period of operational normalcy until the system maintenance is required; and
controlling an operation of the system based on the generated control strategy.

2. The method of claim 1, wherein the operational data includes instructions sent to the subsystems, measurements of subsystem operation, or data output from the subsystems during operation.

3. The method of claim 1, wherein the future condition of each of the plurality of subsystems is estimated by a plurality of distributed prognostic engines that are disposed locally with respect to the plurality of subsystems.

4. The method of claim 1, wherein the future condition of each of the plurality of subsystems is a measure of operational quality of the corresponding subsystem.

5. The method of claim 1, wherein the future condition of each of the plurality of subsystems is a measure of predicted time to failure of the corresponding subsystems.

6. The method of claim 1, wherein the future condition of each of the plurality of subsystems is a measure of predicted operational efficiency of the corresponding subsystem.

7. The method of claim 1, wherein the generated control strategy defines a level of utilization for each subsystem of the plurality of subsystems.

8. The method of claim 7, wherein the generated control strategy dictates that subsystems with a future condition that is estimated to be relatively poor are defined to have a relatively low level of utilization while subsystems with a future condition that is estimated to be relatively strong are defined to have a relatively high level of utilization.

9. The method of claim 1, wherein the generated control strategy maximizes a time until the system maintenance is required.

10. The method of claim 1, wherein the generated control strategy delays the need for the system maintenance until the system maintenance becomes available.

11. The method of claim 1, wherein the generated control strategy minimizes a risk of system failure by reducing utilization to one or more compromised subsystems, wherein a compromised subsystem is a subsystem that has been estimated to have a poor future condition.

12. The method of claim 11, wherein utilization of the compromised subsystems is reduced by diverting operational responsibility to other subsystems of the plurality of subsystems that are not compromised.

13. A controlled system, comprising:
a plurality of subsystems, wherein at least one subsystem of the plurality of subsystems comprises a physical component;
an optimization and control engine configured to receive operational data from the plurality of subsystems, generate a control strategy for delaying a need for system maintenance based on an estimated future condition of each of the plurality of subsystems, wherein the control strategy maximizes a period of operational normalcy until the system maintenance is required, and control the operation of the system based on the generated control strategy; and
a plurality of prognostic engines disposed locally with respect to the plurality of subsystems for receiving the operational data from the subsystems and collaboratively estimating the future condition of each of the plurality of subsystems using prognostic analysis, wherein the prognostic analysis comprises:
constructing a health indicator for each subsystem based on combining multiple measurements of the operational data using an evolving self-organizing map algorithm, and
calculating a prediction of remaining useful life wherein:
on a condition the health indicator has no observable trend, the prediction is based on a function of instances when the health indicator exceeds a threshold over a predetermined period of time; and
on a condition that the health indicator has an increasing trend, the prediction is based on a continuous Bayesian update of a fault progression for parameters to a predicted performance deviation reaching a threshold.

14. The system of claim 13, wherein the operational data includes instructions sent to the subsystems, measurements of subsystem operation, or data output from the subsystems during operation.

15. The system of claim 13, wherein the prognostic engine comprises a plurality of distributed processing units that are disposed locally with respect to the plurality of subsystems.

16. The system of claim 13, wherein the future condition of each plurality of subsystems is a measure of operational quality of the corresponding subsystems, a measure of predicted time to failure of the corresponding subsystem, or a measure of predicted operational efficiency of the corresponding subsystem.

17. The system of claim 13, wherein the generated control strategy defines a level of utilization for each subsystem of the plurality of subsystems, dictates that subsystems with a future condition that is estimated to be relatively poor are defined to have a relatively low level of utilization while subsystems with a future condition that is estimated to be relatively strong are defined to have a relatively high level of utilization, maximizes a time until the system maintenance is required, delays the need for the system maintenance until the system maintenance becomes available, or minimizes a risk of system failure by reducing utilization to one or more compromised subsystems, wherein a compromised subsystem is a subsystem that has been estimated to have a poor future condition.

18. The method of claim 1, wherein the control strategy extends an amount of time at least one subsystem maintains operational normalcy after a degradation of the at least one subsystem occurs.

19. The method of claim 1, further comprising:
determining, from the operational data, that degradation of one or more of the plurality of subsystems has occurred,
wherein the control strategy maximizes the period of operational normalcy during a period of the degradation of the one or more of the plurality of subsystems.

* * * * *